United States Patent [19]

Arifuku et al.

[11] Patent Number: 5,103,250
[45] Date of Patent: Apr. 7, 1992

[54] DATA IMPRINTING APPARATUS IN A CAMERA

[75] Inventors: Kiyoshi Arifuku, Yokohama; Koichi Matsumura, Kawasaki, both of Japan

[73] Assignee: Canon Kabushiki Kaisha, Tokyo, Japan

[21] Appl. No.: 547,043

[22] Filed: Jul. 2, 1990

[30] Foreign Application Priority Data

Jun. 30, 1989 [JP] Japan .................. 1-166545

[51] Int. Cl.⁵ .............................. G03B 17/24
[52] U.S. Cl. ...................................... 354/106
[58] Field of Search ...................... 354/105, 106

[56] References Cited

U.S. PATENT DOCUMENTS

| | | | |
|---|---|---|---|
| 4,458,996 | 7/1984 | Harigaya et al. | 354/412 |
| 4,491,399 | 1/1985 | Bell | 352/92 |
| 4,500,183 | 2/1985 | Tanikawa | 354/21 |
| 4,692,397 | 10/1990 | Ishikawa et al. | 354/21 |
| 4,728,978 | 3/1988 | Inoue et al. | 354/289.1 |
| 4,825,233 | 4/1989 | Kanai et al. | 354/106 |
| 4,938,585 | 7/1990 | Weiffenbach et al. | 352/92 |
| 4,942,413 | 7/1990 | Saegusa et al. | 354/173.11 |
| 4,989,025 | 1/1991 | Matsumura et al. | 354/106 |

FOREIGN PATENT DOCUMENTS 48-35481 10/1973 Japan .
61-56495 12/1986 Japan .
62-51456 10/1987 Japan .

*Primary Examiner*—Michael L. Gellner
*Attorney, Agent, or Firm*—Fitzpatrick Cella Harper & Scinto

[57] ABSTRACT

A data imprinting apparatus in a camera for imprinting data onto film is provided within memory means capable of electrically rewriting data and capable of retaining the data independently of the driven state of the data imprinting apparatus, and imprinting means for imprinting the data memorized by the memory means onto the film.

32 Claims, 8 Drawing Sheets

```
0  0  1  2  4
4  8  F  0  0
```

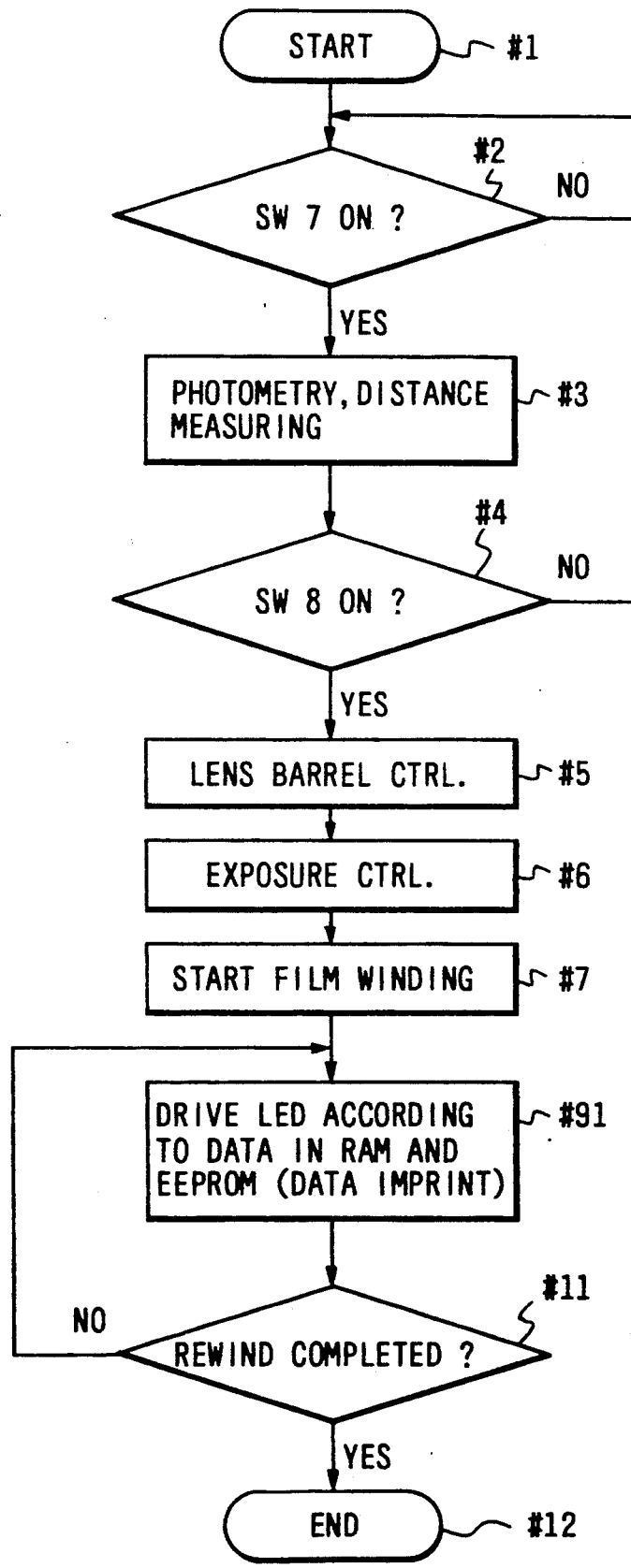

DATA IMPRINTING APPARATUS IN A CAMERA

BACKGROUND OF THE INVENTION

1. Field of the Invention

This invention relates to a data imprinting apparatus in a camera for imprinting data onto film.

2. Related Background Art

The data imprinting apparatus of this type, as described in Japanese Patent Publication No. 62-51456, has heretofore been designed to memorize data to be imprinted in a memory in advance each time photographing is effected, and imprint the data onto film.

Also in Japanese Patent Publication Nos. 48-35481 and 61-56495, there are disclosed such designs that data to be imprinted are memorized in a memory in advance and the photographer selects the data in the memory and read out and imprinted the data from the memory each time he effects photographing.

However, the former example of the prior art has suffered from the disadvantage that the data to be imprinted must be set and memorized in the memory each time photographing is effected and thus, much time is required for setting and the the information photograph opportunity is lost. Also, the latter example of the prior art has suffered from the disadvantage that the data to be imprinted must be selected from among a plurality of data predetermined on the part of the maker and thus, the photographer cannot set data by himself as he likes.

SUMMARY OF THE INVENTION

The present invention has been made in view of the above-noted circumstances and is intended to provide a data imprinting apparatus in a camera for imprinting data onto film which is provided with memory means capable of electrically rewriting data and capable of retaining the data independently of the driven state of the data imprinting apparatus, and imprinting means for imprinting the data memorized by the memory means onto the film and with which the user can rewrite in advance the data to be imprinted as desired and which is free from the cumbersomeness with which the user effects the writing-in of data each time before photographing.

Other objects of the present invention will become apparent from the following detailed description of some specific embodiments taken in conjunction with the accompanying drawings.

BRIEF DESCRIPTION OF THE DRAWINGS

FIG. 7 is a flowchart showing the operation of the camera of FIG. 6.

DESCRIPTION OF THE PREFERRED EMBODIMENTS

Some embodiments of the present invention will hereinafter be described with reference to the drawings.

Figure 1:
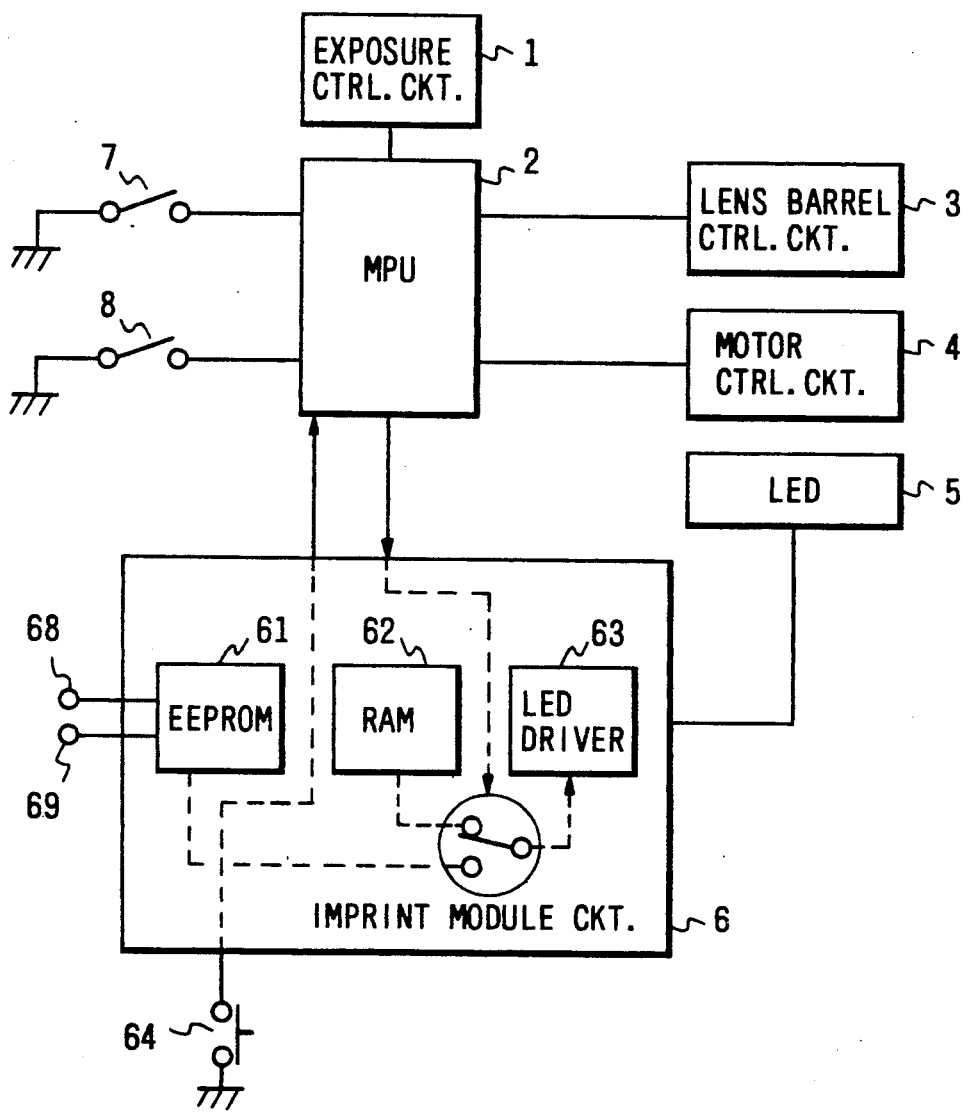
FIG. 1 is a block diagram of a camera showing an embodiment of the present invention.

FIG. 1 is a block diagram of a camera showing an embodiment of the present invention. In FIG. 1, the reference numeral 1 designates an exposure control circuit, the reference numeral 2 denotes r microcomputer for controlling each control circuit, the reference numeral 3 designates a lens barrel control circuit for effecting focusing, the reference numeral 4 denotes a motor control circuit for controlling the winding and rewinding of film, the reference numeral 5 designates an LED for imprinting data onto the film, and the reference numeral 6 denotes an imprint module circuit for storing therein data to be imprinted onto the film and driving the LED 5 in accordance with the data. The imprint module circuit 6 has therein an EEPROM (electronic erasable PROM) 61 which is mountable in the circuit and capable of electrically erasing and writing internal data and which will not lose data even if the power source is cut off, a RAM 62 into which data is written during photographing, and an LED driver 63 for driving the LED 5. The reference numeral 7 designates a switch for causing the camera to effect photometry and distance measurement before photographing, the reference numeral 8 denotes a switch for causing the camera to perform the photographing operation, the reference numeral 64 designates a selecting switch for selecting the EEPROM 61 or the RAM 62, the reference numeral 68 denotes a data input terminal for writing data into the EEPROM 61, and the reference numeral 69 designates a clock input terminal for latching data.

Figure 2:
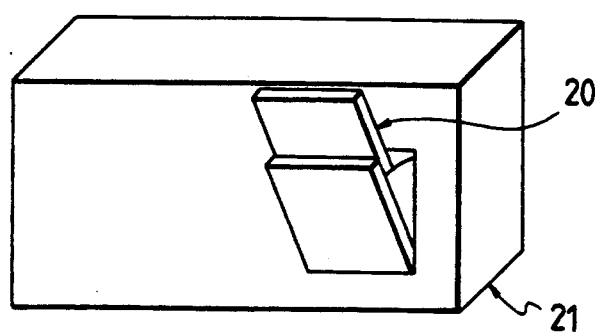
FIG. 2 is a perspective view showing a card containing an EEPROM therein as it is loaded into the data imprinting apparatus of the camera of FIG. 1.

FIG. 2 shows a card 20 containing the EEPROM 61 therein as it is loaded into the back lid (the data imprinting apparatus) of the camera 21. The EEPROM 61 is also interchangeable by interchanging the card 20. Accordingly, although not shown, the EEPROM 61 (the card 20) has a connection terminal connected to other circuit in the data imprinting apparatus, and of course, the other circuit in the data imprinting apparatus is provided with a terminal to which the connection terminal is connected.

The operation will now be described with reference to the flowchart of FIG. 3.

When the switch 7 is closed, the microcomputer 2 first operates a distance measuring and photometry circuit, not shown, which thus starts photometry and distance measurement. When the switch 8 is then closed, the microcomputer 2 outputs information obtained by the distance measuring operation to the lens barrel control circuit 3, which thus operates a lens barrel, not shown, on the basis of the output information. When this operation is completed, the microcomputer 2 outputs information obtained by the aforementioned photometering operation to the exposure control circuit 1. Thereby, the control of a shutter, not shown, is effected and the exposure of the film is started. When the exposure of the film is completed, the microcomputer outputs a winding signal to the motor control circuit 4 to effect the winding of the film, and the winding of one frame of exposed film is started.

In synchronism with the above-described film winding operation, the LED 5 is driven by the LED driver 63 in accordance with the content of the RAM 62 if the selecting switch 64 is ON, and in accordance with the content of the EEPROM 61 if the selecting switch 64 is OFF, and data is imprinted onto the film.

The content thus imprinted, if in accordance with the RAM 62, is information such as the shutter speed during photographing into which the value controlled by the microcomputer 2 has been read, the aperture value, the data or typical characters, and if in accordance with the EEPROM 61, is data including so-called character information such as characters written in from the data input terminal 68 in advance, for example, a place name or a season. For such content to be imprinted onto the film, it must be written in in accordance with a predetermined form, but the discussion of .he imprint form is not the gist of the present invention and therefore need not be described herein.

Description will now be made of a case where the content of the EEPROM 61 contained in the card 20 is changed.

Figure 4:
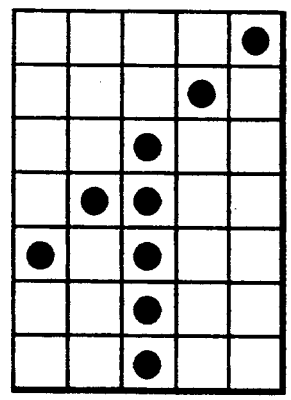
FIG. 4 shows an example of the case where data is written into the EEPROM shown in FIG. 1.

This is effected by connecting a conventional extraneous writing device to the terminals 68 and 69. When for example, a character as shown is to be written in, "04", "08", "1F", "20" and "40" may be entered in the hexadecimal display of 8-bit construction if expressed by dots as shown in FIG. 4. In the case of "04", it is expressed as "00000100" in the binary display, and during the imprinting onto the film, a dot corresponding to the place of "1" is turned on. Next, "08" is expressed as "00001000", and likewise the dot corresponding to the place of "1" is turned on. When five bytes are turned on in this manner, said character can be imprinted onto the film. Since the EEPROM 61 can electrically rewrite the content thereof, characters and numbers can be freely rewritten by a signal applied to the data input terminal 68 (in synchronism with a clock to the clock input terminal 69).

Figure 5:
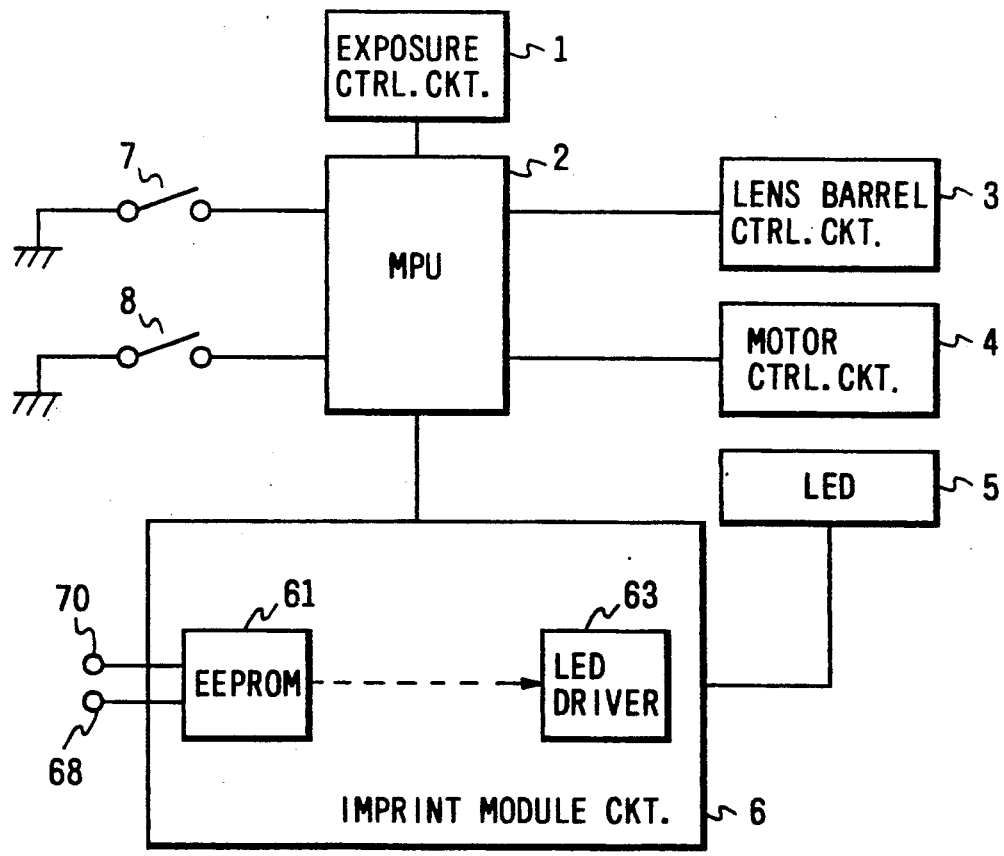
FIG. 5 is a block diagram of a camera showing another embodiment of the present invention.

FIG. 5 is a block diagram of a camera showing another embodiment of the present invention. In FIG. 5, portions identical to those in FIG. 1 are given identical reference numerals and need not be described.

The differences of the embodiment cf FIG. 5 from the embodiment of FIG. 1 are the absence of RAM 62, the replacement of the clock input terminal 69 by the enable terminal 70 of the EEPROM 61, and the elimination of the selecting switch 64.

Figure 3:
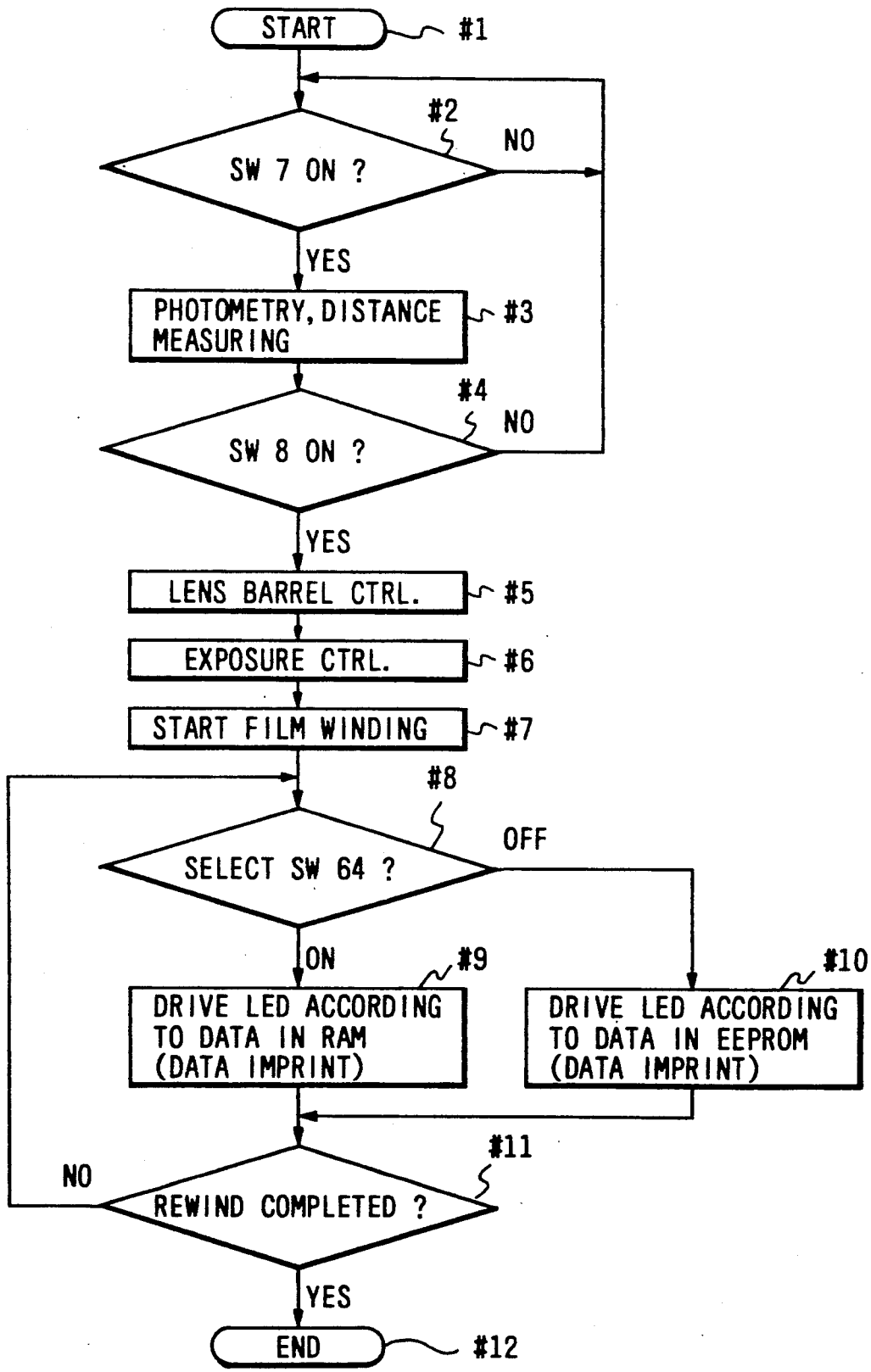
FIG. 3 is a flowchart showing of operation of the camera of FIG. 1.

The operation of the present embodiment is the same as the flow of FIG. 3 from which the steps #8 and #9 have been eliminated, that is, a flow of operation like #1→#2→#3→#4→#5→#6→#7→#10→#11→#12. Also, a feature of the present embodiment is the possibility of decreasing the number of switches.

Figure 6:
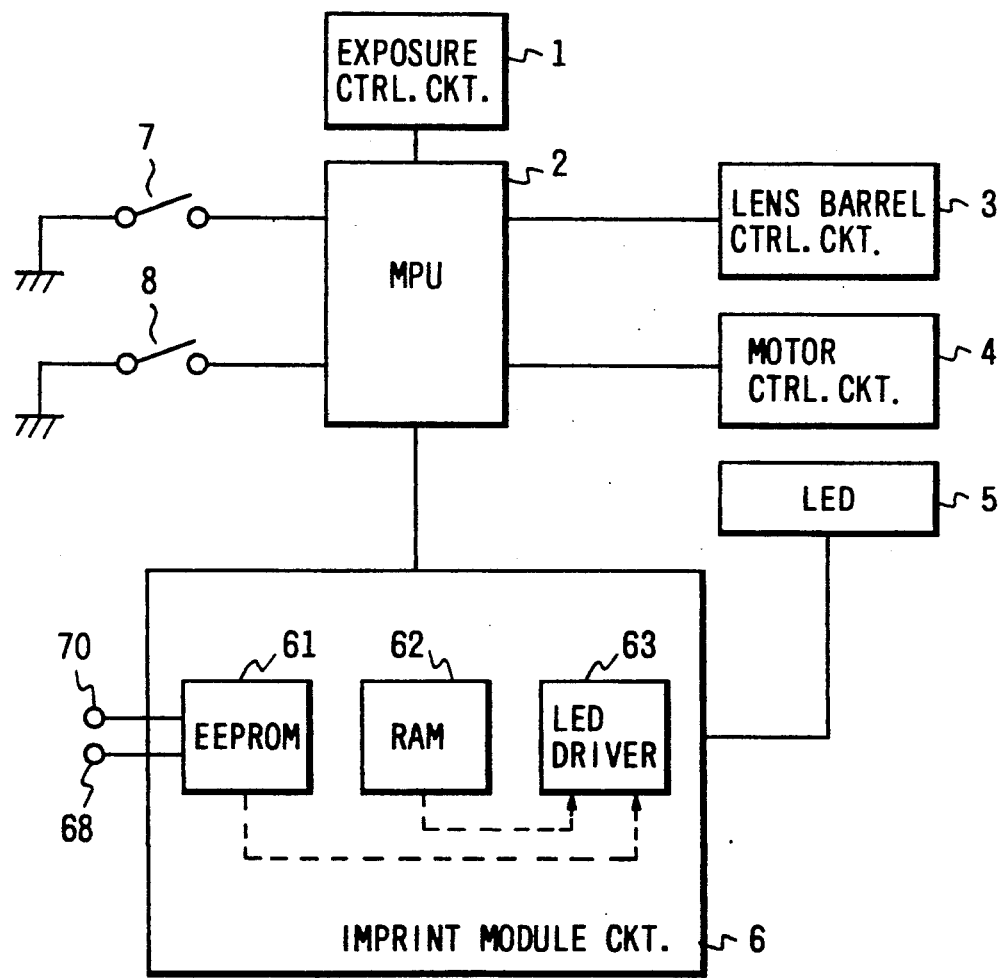
FIG. 6 is a block diagram of a camera showing still another embodiment of the present invention.

FIG. 6 is a block diagram of a camera showing still another embodiment of the present invention. In FIG. 6, portions identical to those in FIGS. 1 and 5 are given identical reference numerals and need not be described.

In this embodiment, the RAM 62 shown in FIG. 1 is added to the embodiment of FIG. 5. In the present embodiment, the data of the EEPROM 61 and the data of the RAM 62 are imprinted at one time.

The operation of the present embodiment is such that as shown in FIG. 7, the steps #8-#10 of FIG. 3 are replaced by a step #9' and at the step #9', the data of the EEPROM 61 and the data of the RAM 62 are imprinted at one time. In the other points, the operation of the present embodiment is the same as the operation shown in FIG. 3 and therefore, identical characters are given in FIG. 7 and the description thereof is omitted.

Figure 8A:
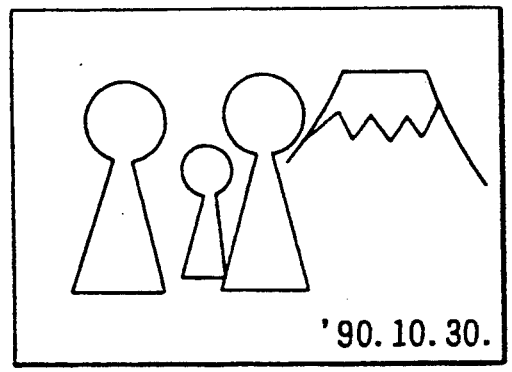
FIGS. 8A-8C illustrate the forms of data imprinting by the camera of FIG. 6.
Figure 8B:
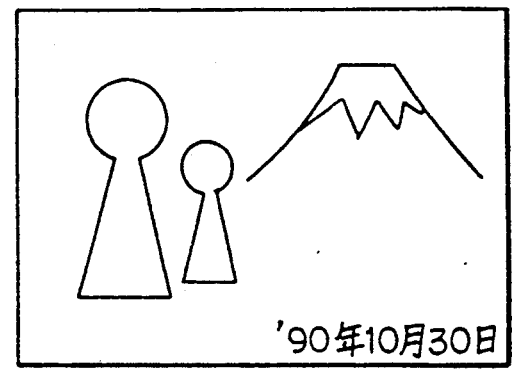
Figure 8C:
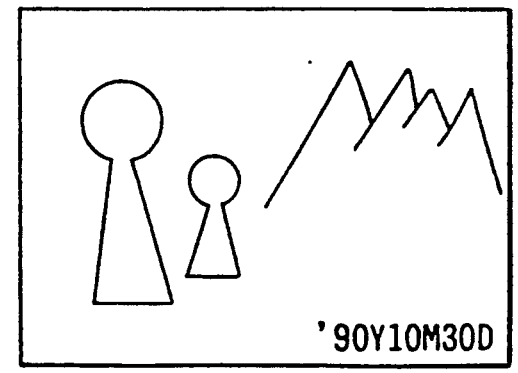

According to the present embodiment, RAM 62 outputs the time information indicating the present time such as in year, month and day as shown in FIG. 8A. EEPROM 61 outputs units in accordance with countries where the camera is used, for example in Japan it outputs "* (year)", "* (month)" and " ʙ(day)" as shown in FIG. 8B or in the United States and other English-spoken countries it outputs "Y (year)", "M (month)" and "D (day)" as shown in FIG. 8C. Thus it will be possible to assume forms of imprinting appropriate to desired countries.

Of course, the writing of said units into the EEPROM 61 may be done by the user himself, hut it will be more convenient if units in importing countires are written in advance on the part of the maker In this case, the EEPROM is used and therefore, even if the user does not like the units set on the part of the maker, such units can be rewritten by the user and thus, no problem will arise.

Figure 9:
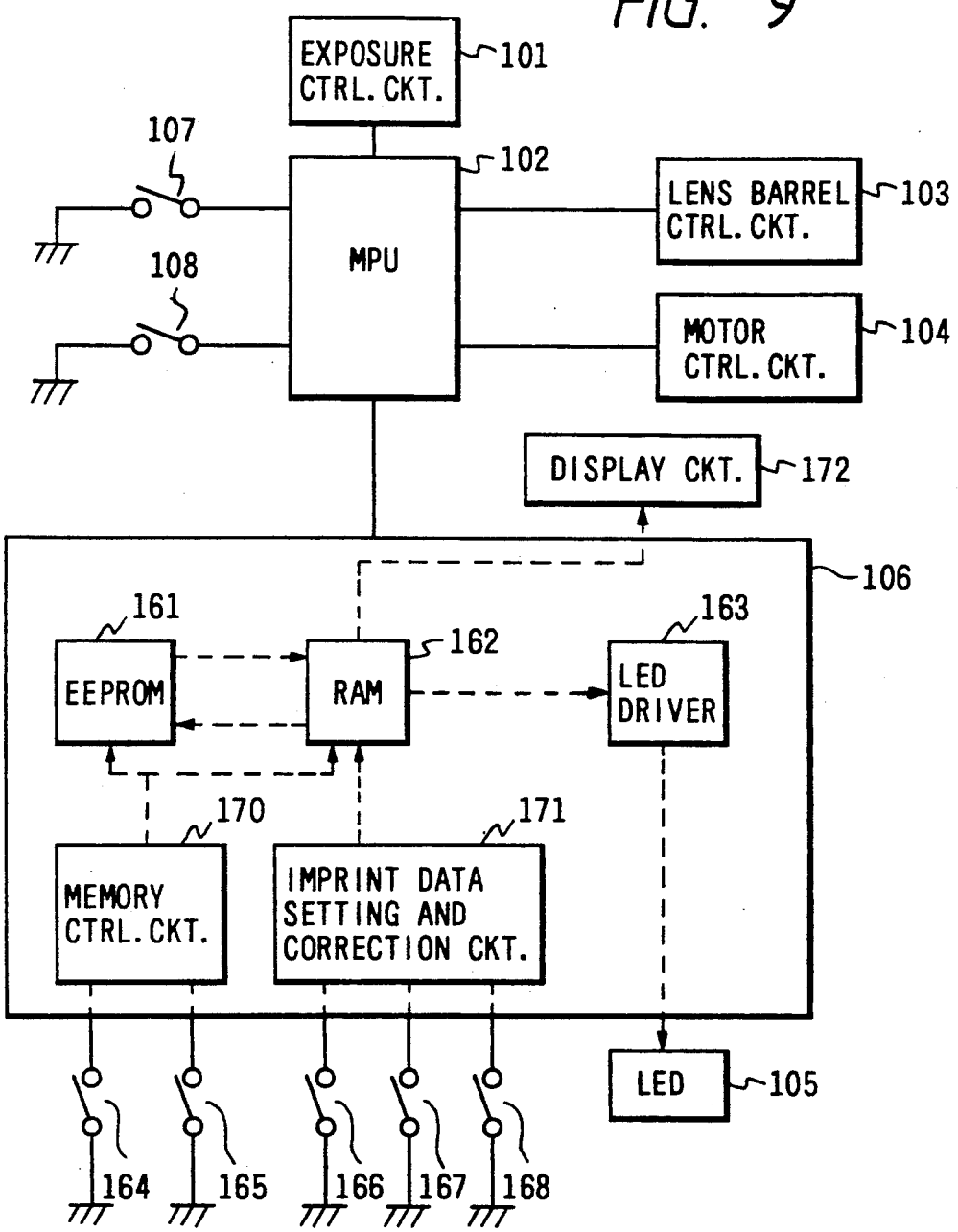
FIG. 9 is a block diagram of a camera showing an embodiment of the present invention.

FIG. 9 is a block diagram of a camera showing still another embodiment of the present invention.

In FIG. 9, the reference numeral 101 designates an exposure control circuit, the reference numeral 102 denotes a microcomputer for controlling each control circuit, the reference numeral 103 designates a lens barrel control circuit for effecting focusing, the reference numeral 104 denotes a motor control circuit for controlling the winding and rewinding of film, the reference numeral 105 designates an LED for imprinting data onto the film, and the reference numeral 106 denotes an imprint module circuit for storing therein data to be imprinted onto the film and driving the LED 105 in accordance with the data. The imprint module circuit 106 has therein an EEPROM 161 which is mountable in the circuit and capable of electrically erasing and writing internal data and which will not lose data even if the power source is cut off, a RAM 162 for memorizing data to be imprinted, an LED driver 163 for driving the LED 105, an imprint data setting and modifying circuit 171 for setting and modifying the data to be imprinted in the RAM 162, and a memory control circuit 170 for transfercontrolling the memorized contents of the RAM 162 and EEPROM 161 in bilateral directions.

The reference numeral 107 designates a switch for causing the camera to effect photometry and distance measurement before photographing, the reference numeral 108 denotes a switch for causing the camera to perform the photographing operation, the reference numeral 164 designates a switch for reading but the data in the EEPROM 161 and transferring the data to the RAM 162, the reference numeral 165 denotes a switch for transferring data set in the RAM 162 to the EEPROM 161, the reference numeral 166 designates a display change-over switch for changing over the data in the RAM 162 displayed by a display circuit 172, the reference numeral 167 denotes a modified portion selecting switch for selecting the portion to be modified of the substance of the data in the RÅM 162 displayed by the display circuit 172, and the reference numeral 168 designates a modifying switch for modifying the portion selected by the modified portion selecting switch 167.

The display circuit 172 is a display circuit comprised of a dot matrix LCD or the like for effecting the display of the data substance in the RAM 162.

Figure 10:
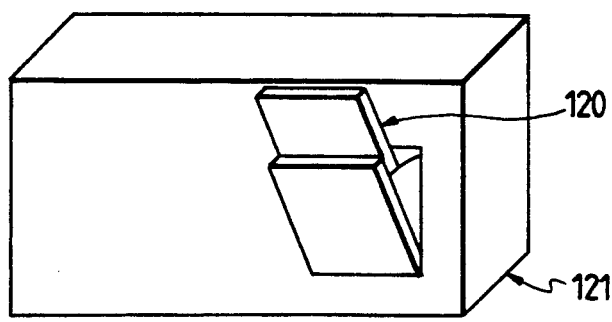
FIG. 10 is a perspective view showing a card containing an EEPROM therein as it is loaded into the data imprinting apparatus of the camera of FIG. 9.

FIG. 10 shows a card 120 containing the EEPROM 161 therein as it is loaded into the back lid (the data imprinting apparatus) of a camera 121, and the interchange of the EEPROM 161 is also possible by interchanging the card 120. Accordingly, the EEPROM 161 (the card 120) has a connection terminal connected to other circuit in the data imprinting apparatus, and of course, the other circuit in the data imprinting apparatus is provided a terminal to which the connection terminal is connected.

Figure 11:
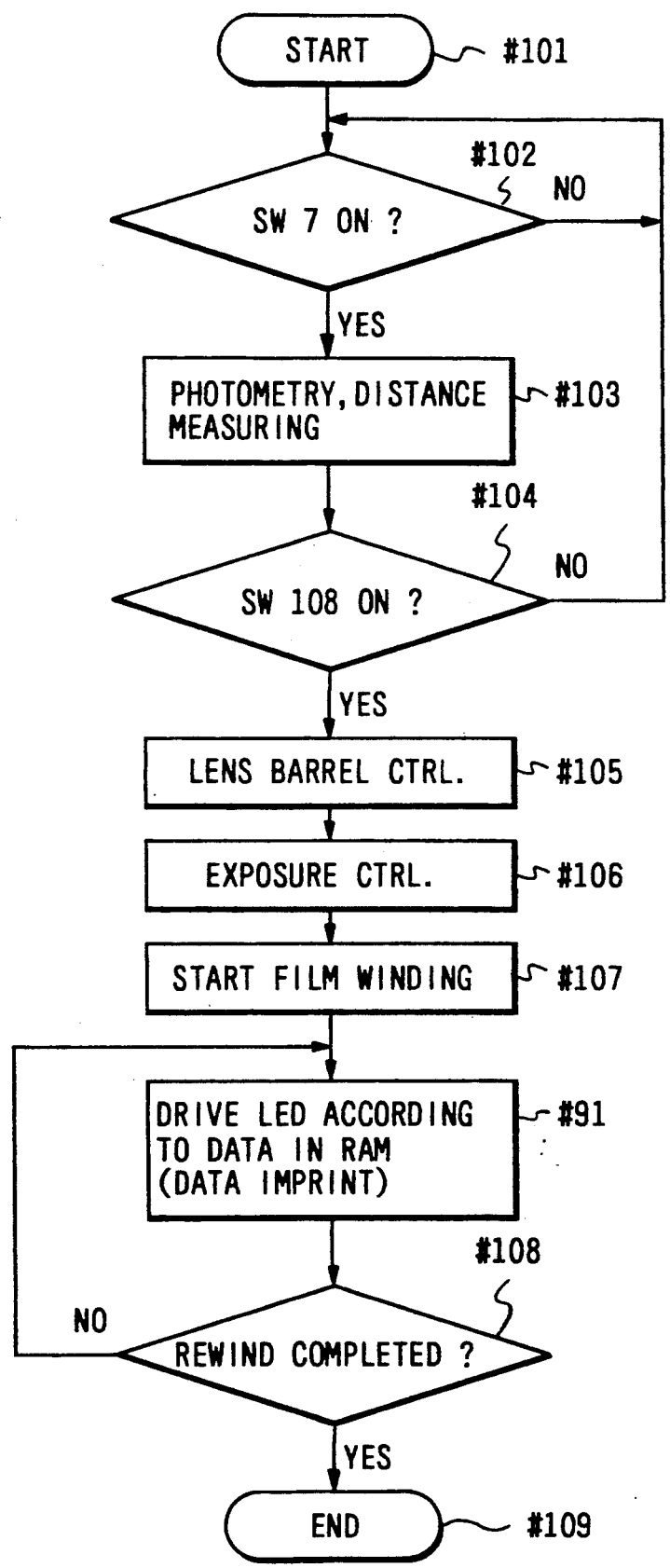
FIG. 11 is a flowchart showing the operation of the camera of FIG. 9.

The operation will now be descried with reference to the flowchart of FIG. 11.

When the switch 107 is closed, the microcomputer 102 first operates a distance measuring and photometry circuit, not shown, and starts photometry and distance measurement. When the switch 148 is then closed, the microcomputer outputs information obtained by the distance measuring operation to the lens barrel control circuit 103, which thus operates a lens barrel, not shown, on the basis of the output information. When this operation is completed, the microcomputer outputs information obtained by the aforementioned photometering operation to the exposure control circuit 101. Thereby the control of a shutter, not shown, is effected and the exposure of film is started. When the exposure of the film is completed, the microcomputer outputs a winding signal to the motor control circuit 104 to effect the winding of the film, and the winding of one frame of exposed film is started.

In synchronism with the above-described film winding operation, the LED 105 is driven by the LED driver 163 in accordance with the content of the RAM 162, and the data in the RAM 162 is imprinted onto the film.

Here, the content of the RAM 162 is data set and modified in the RAM 162 in advance by the imprint data setting and modifying circuit 170 or data transferred from the EEPROM 161.

The data set and modified by the imprint data setting and modifying circuit 171 are as follows.

Each time the display change-over switch 166 is closed, the imprint data stored in the RAM 162 by the imprint data setting and modifying circuit 171 are successively displayed by the display circuit 172.

When desired data is selected, which dot therein should be modified is selected by the modified portion selecting switch 167. This is such that each time the modified portion selecting switch 167 is closed, dots are successively turned on and off to thereby indicate the object of selection. The design is also such that each time the modifying switch 168 is closed in a state in which a certain dot is selected by the modified portion selecting switch 167, ON/OFF changes over alternately with regard to the setting of that dot.

In this manner, data including character information such as a place name and season is written into the RAM 162.

Next, the data transferred from the EEPROM 161 to the RAM 162 are as follows.

The data written into the RAM 162 as previously described may be intactly used for imprinting, but when it is desired to leave that data even after the power source is cut off, the switch 165 is closed, whereby the memory control circuit 170 transfers the data in the RAM 162 to the EEPROM 161.

When this data transferred from the RAM 162 to the EEPROM 161 is to be imprinted, the switch 164 is closed, whereby the data in the EEPROM 161 is transferred to the RAM 162 by the memory control circuit 170 and this data is imprinted as previously described.

In the present embodiment, the design is made such that through the RAM 162, data is written into the EEPROM 161 and the data in the EEPROM 161 is imprinted, and this is because the writing and reading of data into and from the EEPROM takes a longer time than the writing and reading of data into and from the RAM and especially the problem that the reading of data from the EEPROM during imprinting is not in time and further the problem of the durability of the EEPROM can be solved by effecting the memorization of data by the RAM and using the EEPROM only when necessary, as previously described.

According to the above-described embodiments, the EEPROM is added to the imprint module circuit, whereby imprinting of characters, information and marks which could heretofore not be imprinted can be easily accomplished and rewriting thereof can also be accomplished and thus, the design or the like of characters can be done as one likes, and the camera can be made exclusive for one's use.

In the above described embodiments, the EEPROM has been shown as being interchangeable, but of course even if the EEPROM is of the uninterchangeable type, an effect similar to that described above can be obtained.

Also, in the above-described embodiments, use is made of the EEPROM, but of course, the present invention can be equally applied even if the EEPROM is replaced by similar memory means such as an IC memory card.

Further, in the above described embodiments, data is imprinted onto film, but of course, the present invention can be equally applied even in the case of recording of data onto other kind of image recording means.

What is claimed is:

1. A data recording apparatus in a camera for recording data on image recording means comprising:
   memory means capable of electrically rewriting data and capable of retaining the data independently of the driven state of said data recording apparatus;
   data recording means for recording the data memorized by said memory means on said image recording means; and
   a RAM for inputting data to be memorized by said memory means and transferring the data to said memory means.

2. An apparatus according to claim 1, wherein said memory means comprises an EEPROM.

3. An apparatus according to claim 1, wherein said memory means comprises an IC card.

4. An apparatus according to claim 1, herein said image recording means comprises film.

5. An apparatus according to claim 1, wherein said data recording means comprises imprinting means.

6. An apparatus according to claim 1, further comprising
   writing means for writing data into said memory means.

7. An apparatus according to claim 6, wherein said writing means comprises an external terminal.

8. An apparatus according to claim 6, wherein said writing means comprises an external terminal.

9. An apparatus according to claim 1, further comprising
operating means for causing the data in said RAM to be transferred to said memory means.

10. An apparatus according to claim 1, wherein said memory means comprises an IC card.

11. An apparatus according to claim 1, wherein said image recording means comprises film.

12. An apparatus according to claim 1, wherein said data recording means comprises imprinting means.

13. An apparatus according to claim 1, further comprising:
writing means for writing data into said memory means.

14. A data recording apparatus in a camera for recording data on image recording means comprising:
memory means capable of electrically rewriting data and capable of retaining the data independently of the driven state of said data recording apparatus;
data recording means for recording the data memorized by said memory means on said image recording means; and
a RAM to which the data in said memory means is transferred, said data recording means recording on said image recording means the data in said memory means transferred to said RAM.

15. An apparatus according to claim 14, further comprising:
operating means for causing the data in said memory means to be transferred to said RAM.

16. An apparatus according to claim 14, wherein said memory means comprises an EEPROM.

17. A camera provided with a data recording apparatus for recording data on image recording means, comprising:
memory means capable of electrically rewriting data and capable of retaining the data independently of the driven state of said data recording apparatus;
data recording means for recording the data memorized by said memory means on said image recording means; and
a RAM for inputting data to be memorized by said memory means and transferring the data to said memory means.

18. A camera according to claim 17, further comprising:
operating means for causing the data in said RAM to be transferred to said memory means.

19. A camera according to claim 17, wherein said memory means comprises an EEPROM.

20. A camera according to claim 17, wherein said memory means comprises an IC card.

21. A camera according to claim 17, wherein said image recording means comprises film.

22. A camera according to claim 17, wherein said data recording means comprises imprinting means.

23. A camera according to claim 17, further comprising:
writing means for writing data into said memory means.

24. A camera according to claim 17, wherein said writing means comprises an external terminal.

25. A data recording apparatus in a camera comprising:
memory means capable of electrically rewriting data and capable of retaining the data independently of the driven state of said data recording apparatus;
data recording means for recording the data memorized by said memory means on said image recording means; and
a RAM to which the data in said memory means is transferred, said data recording means recording on said image recording means the data in said memory means transferred to said RAM.

26. A camera according to claim 25, further comprising:
operating means for causing the data in said memory means to be transferred to said RAM.

27. A camera according to claim 25, wherein said memory means comprises an EEPROM.

28. A camera according to claim 25, wherein said memory means comprises an IC card.

29. A camera according to claim 25, wherein said image recording means comprises film.

30. A camera according to claim 25, wherein said data recording means comprises imprinting means.

31. A camera according to claim 25, further comprising:
writing means for writing data into said memory means.

32. A camera according to claim 25, wherein said writing means comprises an external terminal.

* * * * *

UNITED STATES PATENT AND TRADEMARK OFFICE
CERTIFICATE OF CORRECTION

PATENT NO. : 5,103,250
DATED : April 7, 1992
INVENTOR(S) : KIYOSHI ARIFUKU, ET AL.

It is certified that error appears in the above-indentified patent and that said Letters Patent is hereby corrected as shown below:

On title page, item [30]
FOREIGN APPLICATION PRIORITY DATA:

Insert: --Jun. 19, 1990 [JP] Japan .... 2-161917--.
Item [56]
U.S. PATENT DOCUMENTS:
   "4,692,397 10/1990 Ishikawa et al." should read
   --4,962,397 10/1990 Ishikawa et al.--.
On title page,
ATTORNEY, AGENT, OR FIRM:

"Fitzpatrick Cella Harper & Scinto" should read
   --Fitzpatrick, Cella, Harper & Scinto--.

COLUMN 1:

Line 18, "read" should read --reads-- and "imprinted"
     should read --imprints--.
   Line 24, "and the the information" should read
     --the information and the--.
   Line 57, "of operation" should read --the operation--.

COLUMN 2:

Line 16, "r" should read --a--.

COLUMN 3:

Line 20, ".he" should read --the--.

COLUMN 4:

Line 13, "English-spoken" should read --English-speaking--.

UNITED STATES PATENT AND TRADEMARK OFFICE
CERTIFICATE OF CORRECTION

PATENT NO. : 5,103,250
DATED : April 7, 1992
INVENTOR(S) : KIYOSHI ARIFUKU, ET AL.

It is certified that error appears in the above-indentified patent and that said Letters Patent is hereby corrected as shown below:

COLUMN 4:

Line 18, "hut" should read --but--.
Line 20, "maker In" should read --maker. In--.
Line 47, "transfercontrolling" should read --transfer-controlling--.
Line 55, "but" should read --out--.

COLUMN 5:

Line 12, "provided" should read --provided with--.
Line 14, "descried" should read --described--.
Line 19, "switch 148" should read --switch 108--.
Line 40, "circuit 170" should read --circuit 171--.

COLUMN 6:

Line 6, "made" should be deleted.
Line 39, "kind" should read --kinds--.
Line 57, "herein" should read --wherein--.
Line 62, "prising" should read --prising:--.
Line 67, "claim 6," should read --claim 13,--.

COLUMN 7:

Line 2, "prising" should read --prising:--.

UNITED STATES PATENT AND TRADEMARK OFFICE
CERTIFICATE OF CORRECTION

PATENT NO. : 5,103,250
DATED : April 7, 1992
INVENTOR(S) : KIYOSHI ARIFUKU, ET AL.

It is certified that error appears in the above-indentified patent and that said Letters Patent is hereby corrected as shown below:

<u>COLUMN 8</u>:

Line 15, "claim 17," should read --claim 23,--.

Signed and Sealed this

Twenty-ninth Day of November, 1994

Attest:

BRUCE LEHMAN

Attesting Officer

Commissioner of Patents and Trademarks